BEST AVAILABLE COPY

J. H. VAN DEVENTER.
ROTARY ENGINE.
APPLICATION FILED APR. 22, 1912.

1,070,085.

Patented Aug. 12, 1913.

WITNESSES:
Walter H. Kelley
Bessie E. Dempsey

INVENTOR
John Herbert Van Deventer
BY
J. W. Ellis
ATTORNEY

UNITED STATES PATENT OFFICE.

JOHN HERBERT VAN DEVENTER, OF BUFFALO, NEW YORK, ASSIGNOR TO BUFFALO FORGE COMPANY, OF BUFFALO, NEW YORK, A CORPORATION OF NEW YORK.

ROTARY ENGINE.

1,070,085.

Specification of Letters Patent.

Patented Aug. 12, 1913.

Application filed April 22, 1912. Serial No. 692,309.

*To all whom it may concern:*

Be it known that I, JOHN HERBERT VAN DEVENTER, a citizen of the United States of America, residing at Buffalo, Erie county, New York, have invented certain new and useful Improvements in Rotary Engines, of which the following is a full, clear, and exact description.

My invention relates to rotary engines and more particularly to engines with rotors, each having a plurality of spirally disposed and intermeshing tooth blades.

In general the objects sought to be obtained by the invention herein described are substantially the same as those set forth in my issued Patent No. 996,169 and my pending application, Serial No. 627,166.

By my invention, I have sought specifically to provide a rotary engine of the type having rotors each provided with a plurality of right-hand spirally disposed tooth blades and a plurality of left-hand spirally disposed tooth blades, said left-hand blades being at a different angle with the axes of the rotors than the said right-hand tooth blades, thus producing a different thrust at one end of the rotors than at the other end.

By this invention, I am able to adapt my rotary engine to machines or other mechanical appliances where it is desired to counterbalance the induced end thrust in such machines or appliances.

In the specification and appended claims, the term "fluid" will be used as a general term for the pressure medium, but the engine is especially adapted for the use of steam and obviously, it is applicable to be driven with either steam or compressed air, as well as any fluid under pressure.

Figure 1:
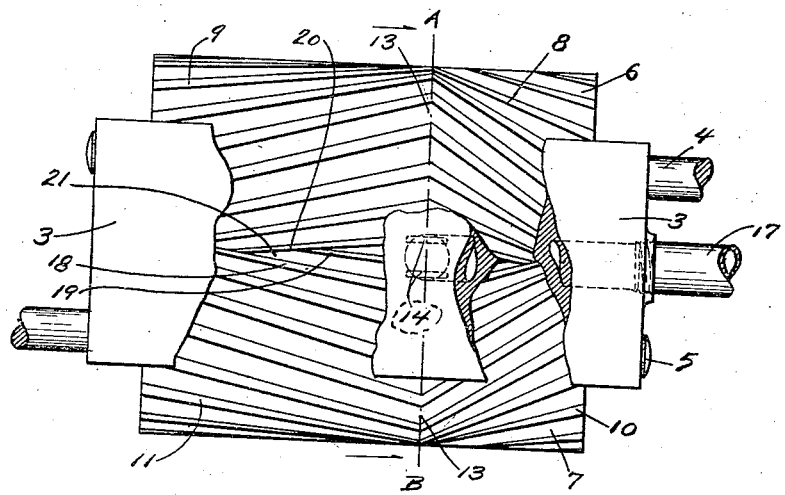
Figure 2:
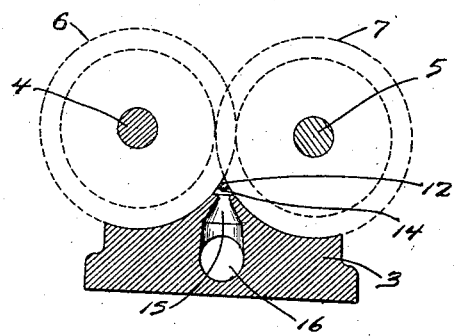

Reference is to be had to the accompanying drawings forming part of this specification, in which like characters of reference indicate like parts, throughout the several views of which:

Figure 1 is a bottom view of my engine with the base broken away and with the intermeshing tooth blades shown diagrammatically. Fig. 2 is a sectional elevation of my engine and is taken on line A—B of Fig. 1 and shows the rotors in a diagrammatic manner.

In the drawings, the base of my engine is represented by the numeral 3. The rotor shafts 4 and 5 are rotatably mounted in suitable bearings, which are preferably integral with the base 3. Mounted upon the shafts 4 and 5 are the rotors 6 and 7, respectively, of my engine. The rotor 6 is provided with a plurality of right-hand spirally disposed tooth blades 8, which extend across the rotor for substantially one-third of its length and a plurality of left-hand spirally disposed tooth blades 9 which extend across the rotor for the remainder of its length. The rotor 7 is provided with a plurality of left-hand spirally disposed tooth blades 10, which extend across the rotor for substantially one-third of its length and a plurality of left-hand spirally disposed tooth blades 11, which extend across the rotor for the remainder of its length. The right-hand tooth blades 8 of the rotor 6 are arranged to mesh with the left-hand tooth blades 10 of the rotor 7 and the left-hand blades 9 of the rotor 6 are arranged to mesh with the right-hand tooth blades 11 of the rotor 7. Buckets are thus formed between the intermeshing tooth blades and make possible the propulsion of the rotors. As the tooth blades of one rotor mesh with those of another rotor, transmission of rotation is secured between the rotors, thus obviating the necessity of employing auxiliary gears.

12 is the rib of my engine which is preferably an integral part of the base 3. This rib is disposed along the entire length of the rotors 6 and 7 and extends up in between the said rotors to the point of intersection of their perimeters and is in conformity and bearing contact therewith. The number of tooth blades in each rotor and the angle which said tooth blades make in the rotor shaft govern the extent to which the said rib envelops the said rotors and it is only necessary that this rib extend around the rotors far enough so as to confine the fluid under pressure to any pair of meshing tooth blades, until the said pair of tooth blades have ceased to mesh or until each bucket formed by the intermeshing tooth blades has developed its full capacity or volume. The rib, may if desired, be continued around the rotors and substantially incase the same. When so formed, the rib provides a casing in which exhaust fluid will be confined and from which the same may be carried to any desired place by suitable piping.

Formed at the junction of each intermeshing tooth blade 8 and 9 on the rotor 6 and each intermeshing tooth blade 10 and 11 on the rotor 7 is an angular pocket 13. Provided in the rib 12 is an inlet port 14 which is disposed near the peak of the rib and at a point in its length which is opposite to the pockets 13. This port is disposed preferably in a horizontal plane and extends through from one side of the rib to the other side. Thus when fluid under pressure enters the said port, it will be caused to impinge on the tooth blades of each rotor at the same time. Connected with the said inlet port 14 is a port 15 which communicates wtih a horizontal port 16. This port 16 extends from the port 15, passes through the base 3 and is screw-threaded at its outer end, whereby suitable inlet piping 17 may be secured to said base.

By referring to the drawings, it will be clearly seen that the tooth blades 18 and 19 on the rotor 7 and the tooth blades 20 on the rotor 8 are in mesh and have formed between them a bucket 21. As the rotors are each provided with right and left-hand tooth blades, two buckets will be formed simultaneously but as each rotor is provided with a plurality of tooth blades, the formation of but one double sided bucket is started. The fluid under pressure is made to impinge upon the tooth blades forming such bucket. Thus an impact action is secured, which causes the rotors to revolve. As the rotors continue to revolve, the capacity or volume of said bucket is greatly increased, due to the recession, toward the ends of the rotors of the points of mesh of the said tooth blades forming the said buckets. As the rotors continue to revolve, by reason of the pressure within the said buckets, the tooth blades forming the said bucket, when passing the inlet port 14. cut off the supply from said bucket. After the supply has been cut off from any one bucket, the fluid contained therein will expand and at the same time exert its expansive energy against the points of mesh or until it has developed its full volume or capacity, or until the tooth blades forming said bucket cease to mesh. Obviously, the ratio of expansion of my engine may be changed by changing the size and location of the inlet port, or the angle and length of the spirally disposed intermeshing tooth blades.

As hereinbefore stated, the right-hand and left-hand tooth blades meet and join and thus form angular pockets. As the fluid under pressure is admitted at this point, it will be seen that leakage of fluid at the junction of the rotors is made impossible. The only place in my engine where leakage of fluid may occur, is between the perimeter of the rotors and the rib, but this may be reduced to a minimum as it is possible to make a very good and practically non-leaking contact or bearing between said perimeter and the rib. The leakage of fluid in my engine is thus reduced to a minimum, which makes the efficiency thereof very high.

Obviously, some modifications of my invention as herein shown and described, may be made without departing from the spirit of my invention or the scope of the appended claims, and I do not wish to be limited to the exact embodiment herein shown and described.

Having thus described my invention, what I claim is:

1. In a rotary engine, the combination of two or more intermeshing and engaging rotors, shafts secured in said rotors and rotatably mounted in suitable bearings, each of said rotors having a series of right-hand spirally disposed tooth blades starting from a plurality of circumferential points on said rotors located at one end thereof and extending toward the center of said rotors, and a series of left-hand spirally disposed tooth blades starting from a plurality of circumferential points on said rotors located at the opposite end thereof and extending toward the center of said rotors, one series of said tooth blades on each rotor making a greater angle with the axis of its rotor than the other of said series of tooth blades on the same rotor, the inner ends of said right and left-hand tooth blades of each rotor meshing and joining and thereby forming angular pockets, and a fluid inlet provided with a port for conducting fluid under pressure to said rotors, said port being so located and formed that said conducted fluid will be impinged within the angular pockets formed by said tooth blades.

2. In a rotary engine, the combination of two or more intermeshing and engaging rotors, shafts secured in said rotors and rotatably mounted in suitable bearings, each rotor having a series of right-hand spirally disposed tooth blades starting from a plurality of circumferential points on said rotors located at one end thereof and extending toward the center of said rotors and a series of left-hand spirally disposed tooth blades starting from a plurality of circumferential points on said rotors located at the opposite ends and extending toward the center of said rotors, one series of said tooth blades on each rotor making a greater angle with the axis of its rotor than the other of said series of tooth blades on the same rotor, said right-hand and left-hand spirally disposed tooth blades of one rotor meshing, respectively, with said left-hand and right-hand spirally disposed tooth blades of another rotor, whereby buckets are formed by the meshing tooth blades of said rotors, and a fluid inlet provided with a port for conducting fluid under pressure to said rotors, said port being so located and formed that said conducted fluid will be impinged within said buckets formed by said tooth blades.

3. In a rotary engine, the combination of two or more intermeshing and engaging rotors, shafts secured in said rotors and rotatably mounted in suitable bearings, each of said rotors having a series of right-hand spirally disposed tooth blades starting from a plurality of circumferential points on said rotors located at one end thereof and extending toward the center of said rotors, and a series of left-hand spirally disposed tooth blades starting from a plurality of circumferential points on said rotors located at the opposite end thereof and extending toward the center of said rotors, one series of said tooth blades on each rotor making a greater angle with the axis of its rotor than the other of said series of tooth blades on the same rotor, the inner ends of said right-hand and left-hand tooth blades of each rotor meshing and joining and thereby forming angular pockets, said right-hand and left-hand spirally disposed tooth blades of one rotor meshing, respectively, with the said left-hand and right-hand spirally disposed tooth blades of another rotor, whereby buckets are formed between the meshing tooth blades of said rotors, and a fluid inlet provided with a port for conducting fluid under pressure to said rotors, said port being so located and formed that said conducted fluid will be impinged within the angular pockets formed by said tooth blades.

4. In a rotary engine, the combination of two or more intermeshing and engaging rotors, shafts secured in said rotors and rotatably mounted in suitable bearings, each of said rotors having a series of right-hand spirally disposed tooth blades starting from a plurality of circumferential points on said rotors located at one end thereof and extending toward the center of said rotors, and a series of left-hand spirally disposed tooth blades starting from a plurality of circumferential points on said rotors located at the opposite end thereof and extending toward the center of said rotors, one series of said tooth blades on each rotor making a greater angle with the axis of its rotor than the other of said series of tooth blades on the same rotor, the inner ends of said right and left-hand tooth blades of each rotor meshing and joining and thereby forming angular pockets, and a fluid inlet provided with a port having lateral passages leading into said pockets, whereby the conducted fluid impacts in said pockets and against said tooth blades substantially in the direction of rotation of said rotors.

5. In a rotary engine, the combination of two or more intermeshing and engaging rotors, shafts secured in said rotors and rotatably mounted in suitable bearings, each of said rotors having a series of right-hand spirally disposed tooth blades starting from a plurality of circumferential points on said rotors located at one end thereof and extending toward the center of said rotors, and a series of left-hand spirally disposed tooth blades starting from a plurality of circumferential points on said rotors located at the opposite end thereof and extending toward the center of said rotors, one series of said tooth blades on each rotor making a greater angle with the axis of its rotor than the other of said series of tooth blades on the same rotor, the inner ends of said right and left-hand tooth blades of each rotor meshing and joining and thereby forming angular pockets, and a rib extending substantially parallel to the axes of said rotors and in contact with the perimeters of said rotors for at least a portion of their peripheries, said rib being provided with a port for conducting fluid under pressure to said angular pockets of said rotors.

6. In a rotary engine, the combination of two or more intermeshing and engaging rotors, shafts secured in said rotors and rotatably mounted in suitable bearings, each of said rotors having a series of right-hand spirally disposed tooth blades starting from a plurality of circumferential points on said rotors located at one end thereof and extending toward the center of said rotors, and a series of left-hand spirally disposed tooth blades starting from a plurality of circumferential points on said rotors located at the opposite end thereof and extending toward the center of said rotors, one series of said tooth blades on each rotor making a greater angle with the axis of its rotor than the other of said series of tooth blades on the same rotor, the inner ends of said right and left-hand tooth blades of each rotor meshing and joining and thereby forming angular pockets, and a rib extending substantially parallel to the axes of said rotors and in contact with the perimeters of said rotors for at least a portion of their peripheries, said rib being provided with lateral passages leading into said pockets, whereby the conducted fluid impacts in said pockets and against said tooth blades substantially in the direction of rotation of said rotors.

7. In a rotary engine, the combination of two or more intermeshing and engaging rotors, shafts secured in said rotors and rotatably mounted in suitable bearings, each rotor having a plurality of right-hand spirally disposed tooth blades starting from a series of circumferential points on said rotors located at one end thereof and extending toward the center of said rotors and a series of left-hand spirally disposed tooth blades starting from a plurality of circumferential points on said rotors located at the opposite ends and extending toward the center of said rotors, one series of said tooth blades on each rotor making a greater angle with the axis of its rotor than the other of said series of tooth blades on the same rotor, said right-hand and left-hand spirally disposed tooth blades of one rotor meshing, respectively, with said left-hand and right-hand spirally disposed tooth blades of another rotor, whereby buckets are formed between the meshing tooth blades of said rotors and a rib extending substantially parallel to the axes of said rotors in contact with the perimeters of said rotors for at least a portion of their peripheries, said rib being provided with a port for conducting fluid under pressure to said buckets of said rotors.

8. In a rotary engine, the combination of two or more intermeshing and engaging rotors, shafts secured in said rotors and rotatably mounted in suitable bearings, each rotor having a series of right-hand spirally disposed tooth blades starting from a plurality of circumferential points on said rotors located at one end thereof and extending toward the center of said rotors and a series of left-hand spirally disposed tooth blades starting from a plurality of circumferential points on said rotors located at the opposite ends and extending toward the center of said rotors, one series of said tooth blades on each rotor making a greater angle with the axis of its rotor than the other of said series of tooth blades on the same rotor, said right-hand and left-hand spirally disposed tooth blades of one rotor meshing, respectively, with said left-hand and right-hand spirally disposed tooth blades of another rotor, whereby buckets are formed between the meshing tooth blades of said rotors, and a rib extending substantially parallel to the axes of said rotors and in contact with the perimeters of said rotors for at least a portion of their peripheries, said rib being provided with lateral passages leading into said pockets, whereby the conducted fluid impacts in said buckets and against said tooth blades substantially in the direction of rotation of said rotors.

9. In a rotary engine, the combination of two or more intermeshing and engaging rotors, shafts secured in said rotors and rotatably mounted in suitable bearings, each of said rotors having a series of right-hand spirally disposed tooth blades starting from a plurality of circumferential points on said rotors located at one end thereof and extending toward the center of said rotors, and a series of left-hand spirally disposed tooth blades starting from a plurality of circumferential points on said rotors located at the opposite end thereof and extending toward the center of said rotors, one series of said tooth blades on each rotor making a greater angle with the axis of its rotor than the other of said series of tooth blades on the same rotor, the inner ends of said right and left-hand tooth blades of each rotor meshing and joining and thereby forming angular pockets, and a fluid inlet provided with a port so arranged that the admission of fluid under pressure into any pair of meshing tooth blades is cut off by the succeeding meshing tooth blades before the said first mentioned tooth blades have developed their full capacity.

10. In a rotary engine, the combination of two or more intermeshing and engaging rotors, shafts secured in said rotors and rotatably mounted in suitable bearings, each rotor having a series of right-hand spirally disposed tooth blades starting from a plurality of circumferential points on said rotors located at one end thereof and extending toward the center of said rotors and a series of left-hand spirally disposed tooth blades starting from a plurality of circumferential points on said rotors located at the opposite ends and extending toward the center of said rotors, one series of said tooth blades on each rotor making a greater angle with the axis of its rotor than the other of said series of tooth blades on the same rotor, said right-hand and left-hand spirally disposed tooth blades of one rotor meshing, respectively, with said left-hand and right-hand spirally disposed tooth blades of another rotor, whereby buckets are formed between the meshing tooth blades of said rotors and a rib extending substantially parallel to the axes of said rotors and in contact with the perimeters of said rotors for at least a portion of their peripheries, said rib being provided with a port so arranged that the admission of fluid under pressure into any bucket is cut off by the succeeding bucket before the first mentioned bucket has developed its full volume.

In testimony whereof, I have hereunto signed my name in the presence of two subscribing witnesses.

JOHN HERBERT VAN DEVENTER.

Witnesses:
J. WM. ELLIS,
WALTER H. KELLEY.